(12) United States Patent
Takeuchi et al.

(10) Patent No.: US 10,523,091 B2
(45) Date of Patent: Dec. 31, 2019

(54) CONTROL UNIT AND ELECTRIC POWER STEERING DEVICE EMPLOYING CONTROL UNIT

(71) Applicant: Mitsubishi Electric Corporation, Tokyo (JP)

(72) Inventors: Kensuke Takeuchi, Tokyo (JP); Takahiro Okanoue, Tokyo (JP); Masaaki Tanigawa, Tokyo (JP); Akira Kaneko, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 473 days.

(21) Appl. No.: 15/516,430

(22) PCT Filed: Nov. 13, 2014

(86) PCT No.: PCT/JP2014/080062
§ 371 (c)(1),
(2) Date: Apr. 3, 2017

(87) PCT Pub. No.: WO2016/075789
PCT Pub. Date: May 19, 2016

(65) Prior Publication Data
US 2018/0233992 A1    Aug. 16, 2018

(51) Int. Cl.
*H02K 11/02* (2016.01)
*H02K 11/33* (2016.01)
(Continued)

(52) U.S. Cl.
CPC ............. *H02K 11/02* (2013.01); *H02K 5/225* (2013.01); *H02K 11/33* (2016.01); *B62D 5/0463* (2013.01); *H02K 2211/03* (2013.01)

(58) Field of Classification Search
CPC .................................................... H02K 11/02
See application file for complete search history.

(56) References Cited

U.S. PATENT DOCUMENTS

2008/0136265 A1    6/2008  Mizukoshi et al.
2011/0285225 A1   11/2011  Matsuda et al.
(Continued)

FOREIGN PATENT DOCUMENTS

| EP | 2244359 A1 | 10/2010 |
|---|---|---|
| JP | 5039171 B2 | 10/2012 |

(Continued)

OTHER PUBLICATIONS

Communication dated May 24, 2018, from the European Patent Office in counterpart European Application No. 14905791.1.
(Continued)

*Primary Examiner* — Daniel J Cavallari
(74) *Attorney, Agent, or Firm* — Sughrue Mion, PLLC; Richard C. Turner (57) ABSTRACT

A frame has upper and lower surfaces that extend in a perpendicular direction to a motor output shaft, donut-shaped conductive plates are mounted respectively on the upper and lower surfaces, and the conductive plates both include connection-forming terminal portions provided on inner and outer peripheral sides thereof. An inverter circuit is constituted by a power module formed from a plurality of switching elements, a power supply terminal is provided on one side of a package forming the power module, while an output terminal connected to a winding terminal for supplying power to a motor and a control terminal connected to a control signal are provided on an opposing side. The terminal portions on the inner peripheral sides of the conductive plates are connected to the power supply terminal of the power module, and the control board is connected to the control terminal of the power module.

9 Claims, 7 Drawing Sheets

(51) Int. Cl.
*H02K 5/22* (2006.01)
*B62D 5/04* (2006.01)

(56) References Cited

U.S. PATENT DOCUMENTS

2013/0257232 A1* 10/2013 Tomizawa ............. H02K 29/08
　　　　　　　　　　　　　　　　　　　　　　310/68 R
2014/0062236 A1　　3/2014 Taniguchi et al.

FOREIGN PATENT DOCUMENTS

| JP | 2013-151206 A | 8/2013 |
| JP | 2014-054051 A | 3/2014 |
| WO | 2013/111365 A1 | 8/2013 |

OTHER PUBLICATIONS

International Search Report of PCT/JP2014/080062 dated Feb. 10, 2015.

* cited by examiner

CONTROL UNIT AND ELECTRIC POWER STEERING DEVICE EMPLOYING CONTROL UNIT

CROSS REFERENCE TO RELATED APPLICATIONS

This application is a National Stage of International Application No. PCT/JP2014/080062 filed Nov. 13, 2014, the contents of which are incorporated herein by reference in its entirety.

TECHNICAL FIELD

This invention relates to a control unit that controls driving of a motor and is integrated with the motor so as to be coaxial with an output shaft of the motor, and an electric power steering device that employs this control unit.

BACKGROUND ART

In a control unit that is integrated with a motor so as to be coaxial with an output shaft of the motor, main constituent components of the control unit may include a control board installed with a CPU, an inverter circuit that supplies power to the motor, a frame that connects the control board to the inverter circuit, a connector, and a case in which these components are housed.

Here, the frame connects the control board to the inverter circuit both electrically and mechanically, and moreover, the other components are installed thereon. As a result, electric connection and mechanical connection locations have complicated shapes.

Furthermore, as regards electric wiring of the frame, the frame is formed from insulating resin and molded by insert molding, and conductive plates forming + and − lines of a power supply system, for example, are extended through the interior thereof.

At this time, large, high-speed switching currents must be passed through the conductive plates of the power supply system in order to supply power to a winding of the motor, and therefore the conductive plates become a source of noise radiation to the control board including the CPU, which is disposed in the vicinity thereof.

Hence, to solve this problem, a control unit (a control device) having: a semiconductor switching element that forms a three-phase bridge circuit for controlling a current of an electric motor; a capacitor that suppresses a ripple component of the current flowing through the electric motor; a coil that reduces noise generated during a switching operation of the semiconductor switching element; a power circuit portion that includes the semiconductor switching element, the capacitor, and the coil; a heat sink on which the power circuit portion is installed in order to dissipate heat generated by the power circuit portion; and a control board installed with a microcomputer that generates a drive signal for driving the semiconductor switching element, wherein the semiconductor switching element and the capacitor are disposed concentrically as a pair on each arm of the three-phase bridge circuit, and connecting members that electrically connect the arms to the capacitors are disposed on an identical plane while a positive electrode side wire and a negative electrode side wire of a DC power supply are disposed parallel to each other so as to extend along each arm has been proposed (see PTL 1, for example).

CITATION LIST

Patent Literature

[PTL 1] Japanese Patent No. 5039171

SUMMARY OF INVENTION

Technical Problem

However, the prior art includes the following problems.

In the control unit described in PTL 1, the two power supply system conductive plates (+, −), which are connected to connectors in a circuit case that includes the conductive plates, run substantially parallel to each other such that a large number of bent terminal portions stand together in the vicinity of the terminals of components disposed in respective parts of the case.

Note that since a large current flows through the conductive plates, the conductive plates must be made as short as possible, and lengths thereof up to power portions of respective inverter circuits must be made as even as possible. Further, in a case where the conductive plates run parallel to each other, plate widths of the conductive plates are limited, and therefore internal resistance values thereof may increase.

Moreover, a large number of terminal arrays for electrically connecting the control board to a power board are bundled together near the center of the circuit case and extended therefrom, and as a result, the freedom with which components can be arranged on the control board is affected by the terminal arrays.

Hence, in the control unit described in PTL 1, room for improvement remains in the conductive plates that form the power supply system wires extending to the inverter circuit and the connection between the inverter circuit and the control board in terms of using the surface area of the control board more effectively, and making the shapes of the respective conductive plates simpler and more uniform.

This invention has been designed to solve the problems described above, and an object thereof is to obtain a control unit with which the surface area of a control board can be used more effectively, and shapes of respective conductive plates can be simplified and increased in uniformity.

Solution to Problem

A control unit according to this invention is used to control driving of a motor, is formed integrally with the motor so as to be coaxial with a motor output shaft of the motor, and includes: a control board that is housed in the interior of a housing forming an outer covering of the control unit, and that calculates a control signal for the motor and outputs the calculated control signal; an inverter circuit that supplies power to the motor in accordance with the control signal; and a frame that serves as an intermediate member provided between the control board and the inverter circuit, the frame has upper and lower surfaces that extend in a perpendicular direction to the motor output shaft, donut-shaped conductive plates are mounted respectively on the upper and lower surfaces, and the conductive plates both include connection-forming terminal portions provided on inner and outer peripheral sides thereof, the inverter circuit is constituted by a power module formed from a plurality of switching elements, a power supply terminal is provided on one side of a package forming the power module, while an output terminal connected to a winding terminal for supplying power to the motor and a control terminal connected to the control signal are provided on an opposing side, the terminal portions on the inner peripheral sides of the conductive plates are connected to the power supply terminal of the power module, and the control board is connected to the control terminal of the power module.

Advantageous Effects of Invention

In the control unit according to this invention, the frame has upper and lower surfaces that extend in a perpendicular direction to the motor output shaft, the donut-shaped conductive plates are mounted respectively on the upper and lower surfaces, and the conductive plates both include connection-forming terminal portions provided on the inner and outer peripheral sides thereof. The inverter circuit is constituted by the power module formed from a plurality of switching elements, the power supply terminal is provided on one side of the package forming the power module, while the output terminal connected to the winding terminal for supplying power to the motor and the control terminal connected to the control signal are provided on the opposing side. The terminal portions on the inner peripheral sides of the conductive plates are connected to the power supply terminal of the power module, and the control board is connected to the control terminal of the power module.

As a result, the surface area of the control board can be used more effectively, and the shapes of the respective conductive plates can be simplified and increased in uniformity.

DESCRIPTION OF EMBODIMENTS

Preferred embodiments of a control unit according to this invention will be described below using the drawings. Identical or corresponding parts of the drawings will be described using identical reference numerals. Note that the control unit according to this invention is formed integrally with a motor so as to be coaxial with an output shaft of the motor.

Further, a case in which the control unit is applied to an electric power steering device will be described below as an example, but the invention is not limited to this example, and as long as the control unit controls driving of a motor, the control unit need not be applied to an electric power steering device.

First Embodiment

Figure 1:
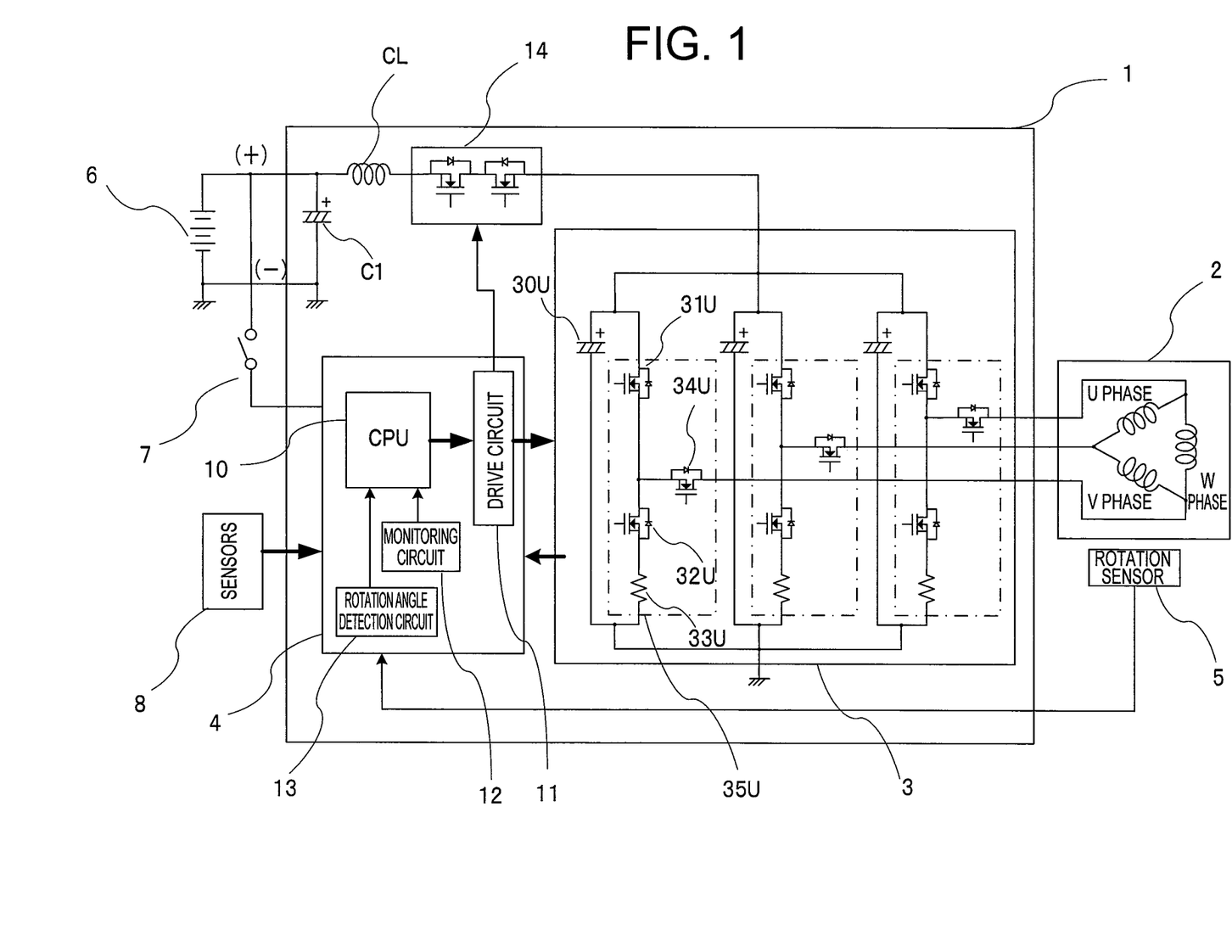
FIG. 1 is a circuit diagram showing an overall circuit configuration of an electric power steering device to which a control unit according to a first embodiment of this invention is applied.

FIG. 1 is a circuit diagram showing an overall circuit configuration of an electric power steering device to which a control unit according to a first embodiment of this invention is applied. In FIG. 1, the electric power steering device is constituted by a control unit 1 and a motor 2.

Note that in the first embodiment, a case in which the motor 2 is a three-phase brushless motor will be described, but the invention is not limited to this configuration, and the motor 2 may be a motor having a brush or any multiphase winding motor having three or more phases.

The control unit 1 includes an inverter circuit 3 that supplies a current to the motor 2, and a control board 4 installed mainly with a CPU 10. Further, a rotation sensor 5 that detects a rotation angle of the motor 2 is provided near an output shaft of the motor 2. Furthermore, the control unit 1 is connected via connectors to a battery 6, an ignition switch 7, and sensors 8 installed in a vehicle.

The control board 4 in the control unit 1 includes the CPU 10 that calculates a control amount to be applied to power supplied to the motor 2 on the basis of information from the sensors 8, which include a vehicle speed sensor and a torque sensor for detecting a steering torque of a steering wheel, an initial stage drive circuit 11 that drives the inverter circuit 3, a monitoring circuit 12 that detects voltages or currents of respective parts of the inverter circuit 3, and a rotation angle detection circuit 13 for detecting the rotation angle of the motor 2 on the basis of information from the rotation sensor 5.

Further, a capacitor C1 and a coil CL for suppressing noise radiation are provided on power supply system lines (+, −) of the control unit 1. Here, these components are comparatively large. Furthermore, a power supply switching element 14 having a relay function for opening and closing the + power supply line is interposed on the power supply system lines.

The power supply switching element 14 is a FET, for example, in which two parasitic diodes provided respectively in a forward direction and a reverse direction relative to a current supply direction are connected in series. Using the power supply switching element 14, the power supply can be cut off forcibly when a fault occurs in the motor 2 or the inverter circuit 3 or the like. Further, using the parasitic diodes, a line along which the current flows can be cut off when the battery 6 is wired in reverse, and as a result, a function for protecting the battery from reverse connection is realized.

The inverter circuit 3 includes a total of six switching elements 31U to 31W, 32U to 32W provided respectively on upper and lower arms of respective phases (U, V, W) of a three-phase winding of the motor 2, and relay switching elements 34U to 34W having a relay function for connecting and disconnecting the motor winding and the switching elements. Note that in FIG. 1, only the U phase components are shown, but the other phases are identical to the U phase.

The switching elements 31U to 31W, 32U to 32W of the upper and lower arms are PWM-driven on the basis of commands from the CPU 10, and therefore capacitors 30U to 30W are also connected to the inverter circuit 3 in order to suppress noise. Shunt resistors 33U to 33W for detecting the currents flowing through the motor 2 are also connected to the inverter circuit 3. Here, a total of three switching elements 31, 32, 34 are disposed in relation to each phase so as to form integrated power modules 35U to 35W for the respective phases.

In an operation of the electric power steering device shown in FIG. 1, briefly, the CPU 10 calculates a current to be supplied to the winding of the motor 2 on the basis of input information from the sensors 8, and outputs the calculated current to the inverter circuit 3 via the drive circuit 11. Next, the switching elements 31, 32, 34 of the respective phases are driven such that a current is supplied to the winding of the motor 2.

Further, a current value of the current supplied to the winding of the motor 2 is detected by the monitoring circuit 12, and feedback control is executed in accordance with a deviation between the calculation value (a target value) calculated by the CPU 10 and the actual current value. Note that the drive circuit 11 also controls the power supply switching element 14 and the relay switching elements 34. The CPU 10 also calculates the rotation position or rotation speed of the motor 2 via the rotation sensor 5 and the rotation angle detection circuit 13, and uses the calculation result during control.

Figure 2:
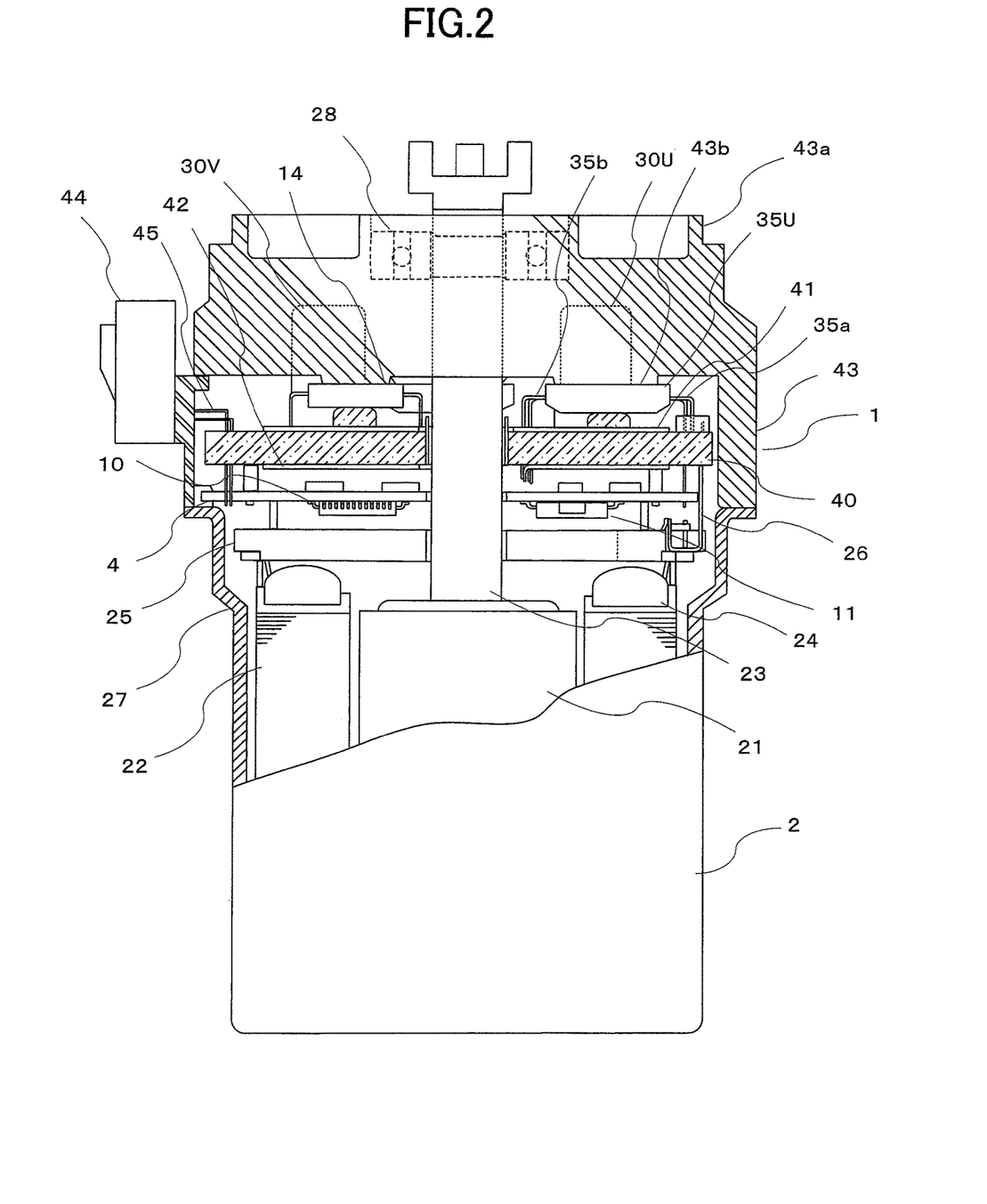
FIG. 2 is a sectional view showing the electric power steering device according to the first embodiment of this invention.

FIG. 2 shows a configuration of the electric power steering device having the circuit configuration described above. FIG. 2 is a sectional view showing the electric power steering device according to the first embodiment of this invention. In FIG. 2, the motor 2 is disposed on a lower side of the drawing, and the control unit 1 is disposed above the motor 2. Further, the control unit 1 is provided in an output direction of an output shaft 23 of the motor 2 so as to be coaxial with the motor output shaft 23.

The motor 2 is formed by disposing a rotor 21 and a stator 22 in the interior of a motor case 27. Permanent magnets, not shown in the drawing, are disposed on the rotor 21 in a plurality of pole pairs so as to surround the output shaft 23. The stator 22 is provided on the periphery of the rotor 21, and a three-phase winding 24 is wound around the stator 22. Further, an annular ring 25 is provided above the three-phase winding 24, and winding ends are delta-connected within the annular ring 25 and then led out to the control unit 1 as a winding terminal 26.

The control unit 1 is formed by disposing the control board 4 installed with the CPU 10, the drive circuit 11, and so on, a frame 40, the power module 35U (35V and 35W are not shown), the power supply switching element 14, and the capacitors 30U, 30V (30W is not shown) respectively in the interior of a housing 43. Note that the power supply switching element 14 may be omitted.

Here, the housing 43 has a cylindrical shape with a substantially identical diameter to the motor case 27, but a part thereof is cut away so as to form a cutaway portion in which a connector 44 is mounted. Further, the connector 44 is mounted in the cutaway portion, and connector terminals 45 are led out into the interior of the housing 43.

Furthermore, the housing 43 is joined to the motor case 27 by bolts, not shown in the drawing, for example. Moreover, the housing 43 includes a joint portion 43a that extends upward in the drawing and is joined to a speed reduction mechanism, not shown in the drawing, for transmitting the rotation of the motor output shaft 23. Further, the housing 43 holds a bearing 28 that allows the output shaft 23 to rotate freely. In the interior of the housing 43, the control board 4 is fixed partially to the motor case 27 and partially to the housing 43. Further, the frame 40 is stacked on top of the control board 4.

As will be described below, the frame 40 is an intermediate member made of insulating resin, and includes surface portions defining a front-rear relationship. Conductive plates 41, 42 are disposed respectively on an upper side surface portion and a lower side surface portion in the drawing. Further, the three power modules 35 are mounted above the frame 40 such that respective upper surfaces of the power modules 35 closely contact a front surface 43b of the housing 43. As a result, a heat dissipation ability of the power modules 35 is improved. Note that the power modules 35 may closely contact the front surface 43b of the housing 43 via sheets.

Furthermore, control terminals 35a, 35b of each power module 35 are passed through the frame 40 and connected to the conductive plates 41, 42 and the control board 4, respectively. The three capacitors 30U, 30V (30W is not shown) and the power supply switching element 14 are also installed on the frame 40.

Further, the connector terminals 45 are passed through the frame 40 in the vicinity of the connector 44, whereupon a part thereof is connected to the conductive plates 41, 42 and the remainder thereof is led out and connected to the control board 4. Note that the rotation sensor 5 shown in FIG. 1 may be provided in the interior of the housing 43 in the vicinity of the bearing 28, and may be constituted by a sensor having a resolver structure, a semiconductor sensor, or the like.

Figure 3:
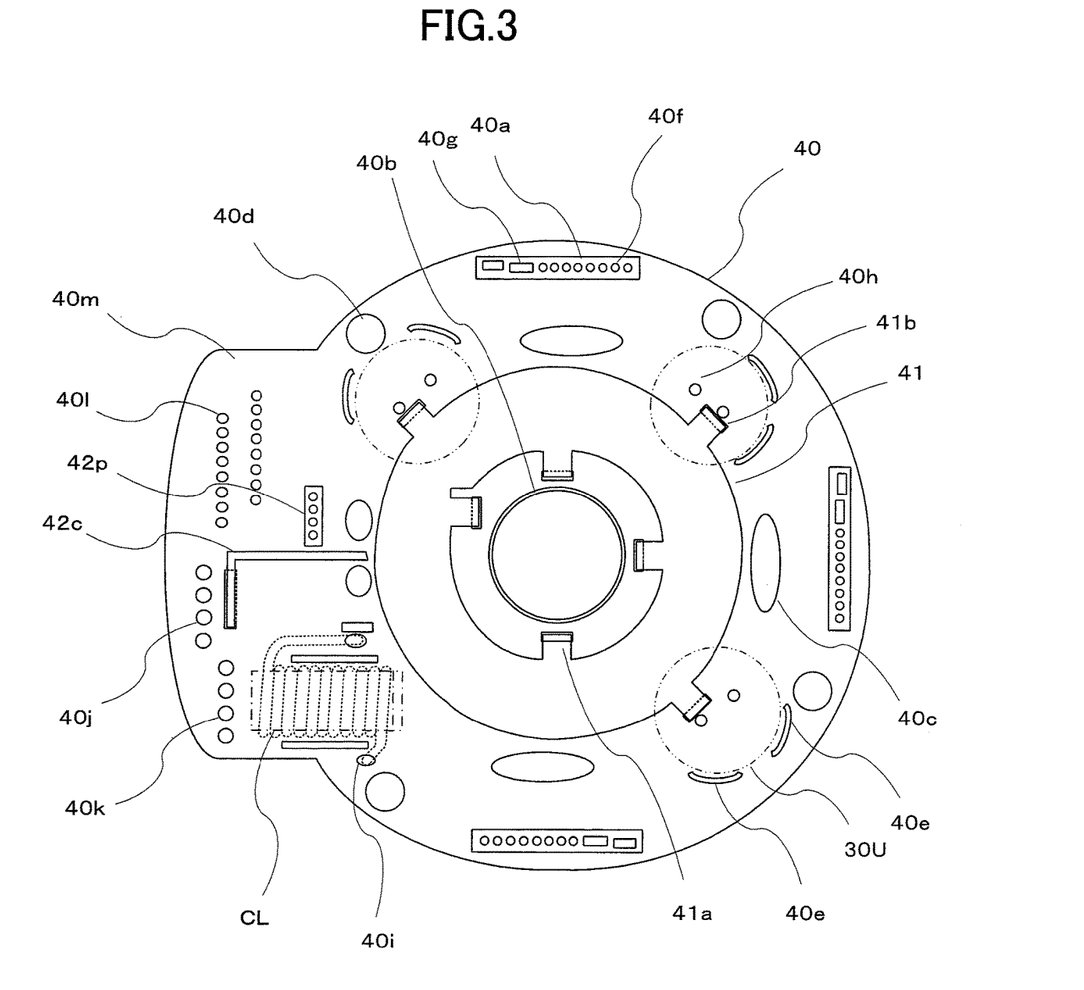
FIG. 3 is a plan view showing one surface of a frame of the electric power steering device according to the first embodiment of this invention.

Next, referring to FIGS. 3 and 4, structures of the frame 40 and the conductive plates 41, 42 will be described in detail. FIG. 3 is a plan view showing one surface of the frame of the electric power steering device according to the first embodiment of this invention. In FIG. 3, the frame 40 is a molded component formed from insulating resin, and apart from a connector side projecting portion 40m, has a substantially circular shape that is identical to the motor case 27.

A hole through which the output shaft 23 can pass is opened in the center of the frame 40, and a tubular portion 40b extends around the periphery of the hole. Further, the power modules 35, the capacitors 30, the coil CL, and so on are mounted on the frame 40, and therefore partitions 40e for holding or positioning the capacitors 30 and the coil CL are erected on the respective peripheries of these components. Projections 40c for holding down the power modules 35 are also formed on the frame 40.

Furthermore, a large number of holes through which leg portions or terminal portions of the respective components pass are opened in the frame 40. Here, holes 40d have a comparatively large diameter, and are provided in four locations, for example, in order to fix the frame 40 itself to the housing 43 by bolts. Moreover, holes 40h, 40i are used to pass leg portions of the capacitors 30 and the coil CL.

Figure 6:
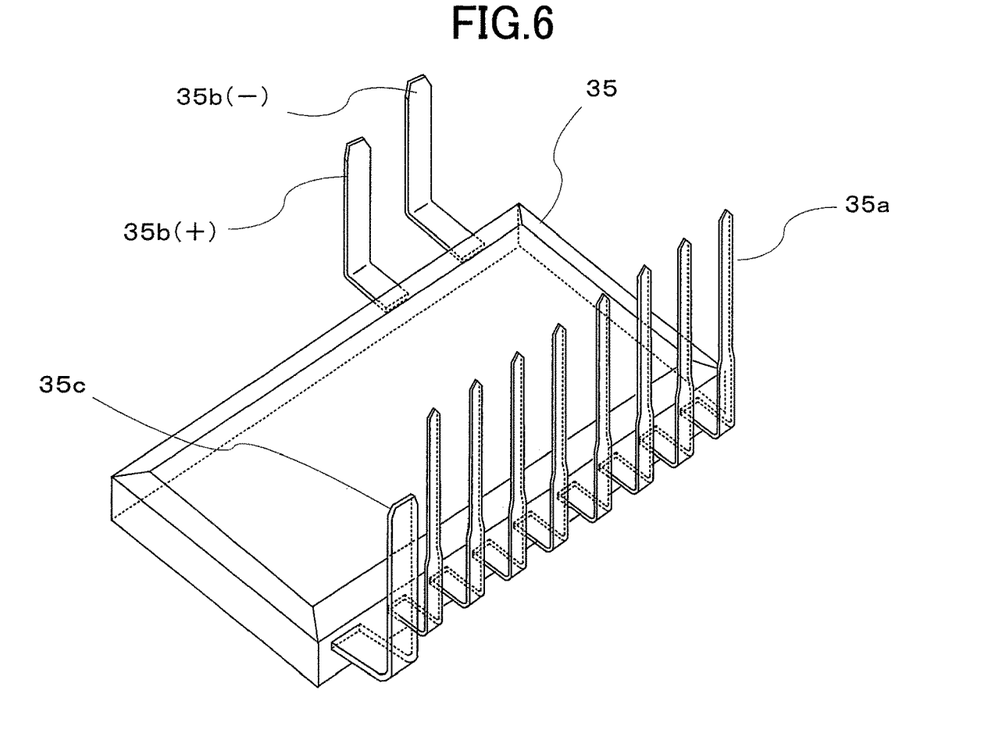
FIG. 6 is a perspective view showing a power module of the electric power steering device according to the first embodiment of this invention.

Further, round holes 40f and rectangular holes 40g are disposed together within a guide 40a and used to pass the control terminals 35a, 35b of the power modules 35, as illustrated in detail in FIG. 6. Moreover, the round holes 40f are used by terminals for transmitting control signals from the drive circuit 11 to the power modules 35 and transmitting monitoring signals from the power modules 35 to the CPU 10.

Furthermore, one of the rectangular holes 40g is used by a terminal for supplying power to the motor winding from the power modules 35, and the winding terminal 26 is inserted into the other. Hence, the two rectangular holes 40g are electrically connected to different components. Note that the round holes 40f may be elliptical holes or polygonal holes.

Further, a guide portion 42p in which four holes are opened is used for control signals for the power supply switching element 14, and the power supply switching element 14 is similar to the power module 35 in that at least two FETs are housed therein. Furthermore, respective pluralities of + power supply terminal holes 40k and − power supply (ground) terminal holes 40j are opened in the connector side projecting portion 40m. A large number of sensor signal holes 40l are also opened therein.

Further, the conductive plates 41, 42, which are formed from copper, for example, are mounted respectively on the upper and lower surfaces of the frame 40. The conductive plate 41 is formed in a donut shape, and includes terminal portions 41a formed in four locations on an inner peripheral side thereof and terminal portions 41b formed in four locations on an outer peripheral side thereof. The terminal portions 41a, 41b pass through the frame so as to project to a rear surface of the drawing.

In the connector side projecting portion 40m of the frame 40, the conductive plate 41 is connected to one leg portion of the coil CL from the vicinity of the + power supply terminal holes 40k of the connector, and the other leg portion is connected to the power supply switching element 14. Thereafter, the other leg portion passes through the power supply switching element 14 and is connected to the conductive plate 41. Hence, the conductive plate 41 forms a + power supply line.

Note that the conductive plate 41 is mounted on the surface of the frame 40, and an adhesive coating, for example, may be employed as a mounting structure. At this time, the plurality of terminal portions 41a or 41b are inserted into rectangular holes opened in the frame 40, and therefore, by providing a structure in which the terminal portions are press-fitted into the rectangular holes, this structure can double as the mounting structure. When this method is employed, mounting components and mounting operations are not required.

Hence, the donut-shaped conductive plate 41 is disposed in the central portion of the frame 40 concentrically therewith, and the terminal portions 41a, 41b for electrically connecting the conductive plate 41 to other members are provided on the inner peripheral and outer peripheral sides thereof. More specifically, the terminal portions 41a are disposed on the inner peripheral side to connect the conductive plate 41 to the two power supply lines (+, −) of the power modules 35. Moreover, a part of the donut shape is connected via the respective components and the power supply line from the terminal of the + power supply connector. Here, by employing a donut shape, the conductive plate 41 can be manufactured in a simple shape without the need to extend the conductive plates through the frame 40, and as a result, the conductive plate 41 can be mounted on the frame 40 more simply.

Figure 4:
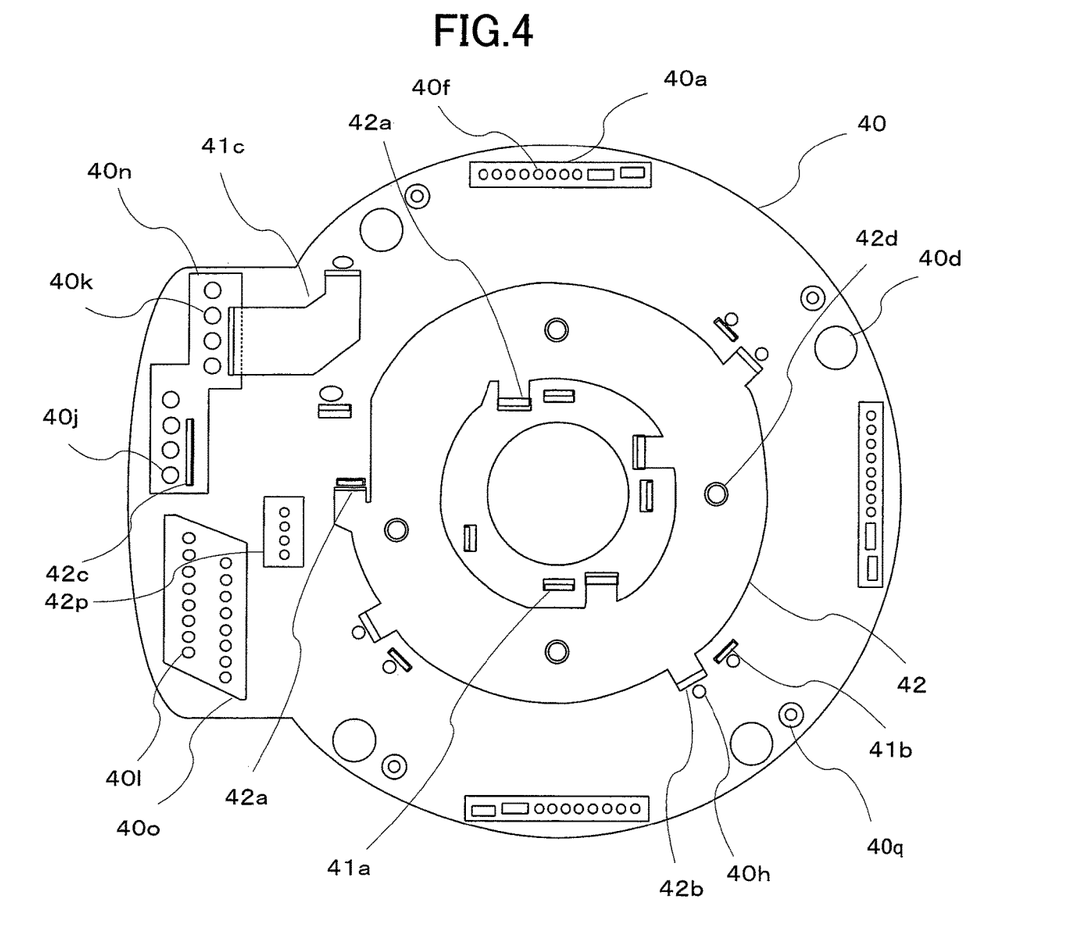
FIG. 4 is a plan view showing another surface of the frame of the electric power steering device according to the first embodiment of this invention.
Figure 5:
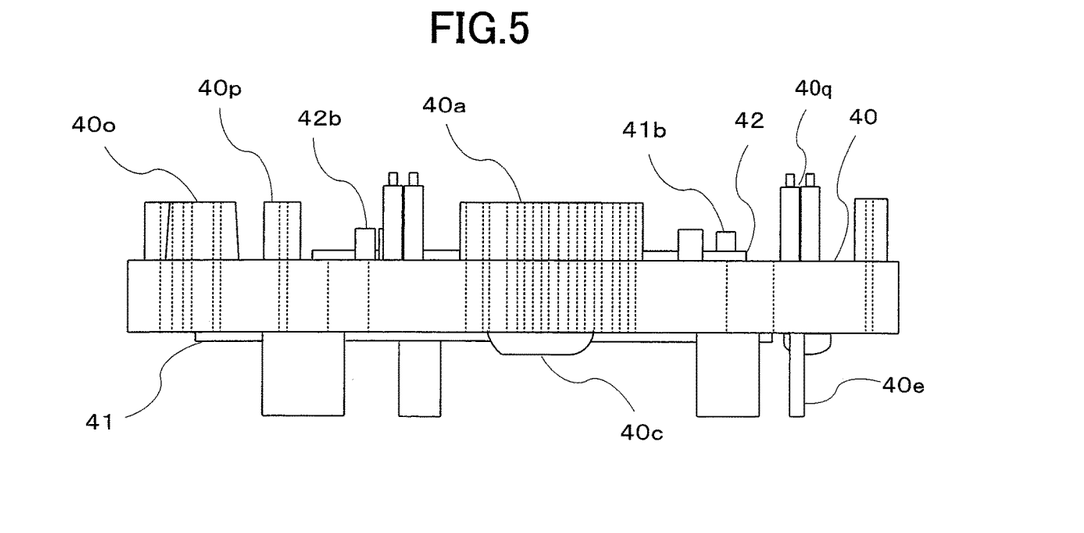
FIG. 5 is a side sectional view showing the frame of the electric power steering device according to the first embodiment of this invention.

FIG. 4 is a plan view showing another surface of the frame of the electric power steering device according to the first embodiment of this invention. FIG. 5 is a side sectional view showing the frame of the electric power steering device according to the first embodiment of this invention. In other words, FIG. 4 shows the rear surface of FIG. 3.

In FIGS. 4 and 5, the conductive plate 42 forms the − power supply (the ground), and similarly to the conductive plate 41 forming the + power supply, is formed substantially in a donut shape so as to be concentric with the central hole in the frame 40. Further, the conductive plate 42 includes terminal portions 42a provided in three locations on an inner peripheral side and four locations on an outer peripheral side to connect the conductive plate 42 to other sites.

Furthermore, the plurality of terminal portions 41a of the conductive plate 41 forming the + power supply are provided to project in the vicinity of the terminal portions 42a. Outer peripheral side terminal portions 42b are disposed in the vicinity of the holes 40h for the leg portions of the capacitors 30 so that the leg portions of the capacitors 30 can be connected to the terminal portions 42b.

Moreover, the guide 40a including the holes 40f, 40g for the terminals of the power modules 35 projects from the front surface of the frame 40 in order to guide the terminals of the power modules 35. Further, a projecting portion 40n is disposed near the connector as a similar guide portion in which the terminal holes 40k, 40j are gathered together. Furthermore, terminal portions of small conductive plates 41c, 42c project from the projecting portion 40n. A projecting portion 40o is provided as a similar guide portion in which the sensor signal holes 40l are gathered together.

The conductive plate 42 can be mounted on the frame 40 by providing a recessed portion in the frame 40 in accordance with the shape of the inner periphery, the outer periphery, or both the inner periphery and the outer periphery of the conductive plate 42, and press-fitting the conductive plate 42 therein. Alternatively, a projecting portion 42d may be formed on the frame 40, a hole may be opened in the conductive plate 42, and the projecting portion 42d may be press-fitted into the hole.

Further, the donut-shaped conductive plate 42 has a large surface area, and can therefore be connected to the frame 40 in any location using various methods. Moreover, columns 40q are disposed in four locations on the frame 40 and used to fix the control board 4 while maintaining a fixed distance from the control board 4.

FIG. 6 is a perspective view showing the power module of the electric power steering device according to the first embodiment of this invention. In FIG. 6, the power module 35 takes a substantially rectangular shape when seen from above, and is configured such that the + power supply control terminal 35a and the − power supply control terminal 35b are provided on one long side thereof, an output terminal 35c is provided near a corner portion of the other long side thereof, and a large number of control terminals 35a are provided adjacent to the output terminal 35c.

The power module 35 is disposed discretely on the frame 40 on the periphery of the output shaft 23. More specifically, the − power supply control terminal 35b is disposed on the periphery of the central hole near the output shaft 23, while the + power supply control terminals 35a and the output terminal 35c are inserted into the holes 40f, 40g provided in the peripheral guide 40a.

Figure 7:
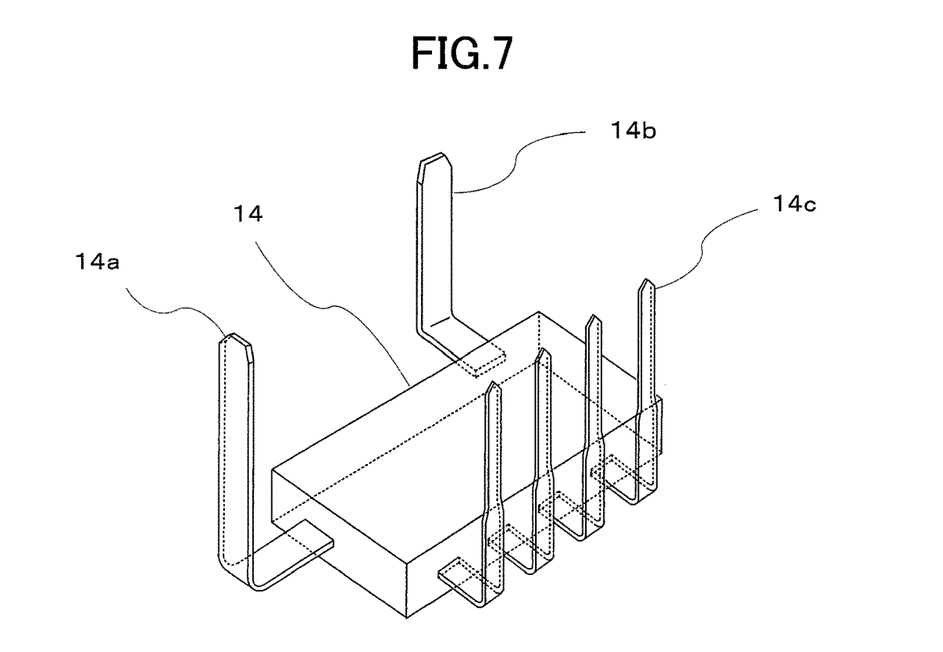
FIG. 7 is a perspective view showing a power supply switching element of the electric power steering device according to the first embodiment of this invention.

FIG. 7 is a perspective view showing the power supply switching element of the electric power steering device according to the first embodiment of this invention. In FIG. 7, the power supply switching element 14, similarly to the power module 35, is formed as a substantially rectangular parallelepiped-shaped package from which various terminals extend.

In the power supply switching element 14, a terminal 14a serves as an input side terminal from the coil CL that is output from a terminal 14b via the two FETs housed in the package. For this purpose, the terminal 14b is welded to the inner peripheral side terminal portion 41a of the conductive plate 41 when mounted on the frame 40. Note that four comparatively thin terminals 14c are control signal terminals and monitoring terminals that are inserted into the guide portion 42p shown in FIGS. 3 and 4.

Hence, planar portions are provided on the front and rear surfaces of the frame 40, the conductive plates 41, 42 serving as substantially donut-shaped power supply lines are disposed respectively thereon, and the terminal portions for forming connections to other sites are provided on the inner and outer peripheral sides. The terminal portions are formed to project to the − power supply conductive plate 42 side, for example, in a parallel direction to the output shaft, and are used to electrically connect leg portions of components to terminals by welding, for example. Furthermore, parts of the donut-shaped conductive plates are electrically connected via the small conductive plates connected to the connector terminals 45.

With this configuration, the connection to the control board 4 is formed on the outer peripheral side, and therefore the surface area of the control board 4 can be used effectively, enabling a reduction in the size of the control unit 1. Further, by employing the donut-shaped conductive plates, the shapes of the conductive plates can be simplified in comparison with a conventional shape.

Furthermore, spaces can be provided between the outer peripheries of the conductive plates 41, 42 and an outer peripheral portion of the frame 40, and components such as the capacitors 30 and the coil CL can be disposed in these spaces. Moreover, connections to the leg portions of these components can be formed by providing terminal portions projecting from the donut-shaped conductive plates such that electric connection locations are formed on only one surface side. As a result, the conductive plates can be engineered more easily.

Further, an electric circuit passing through each conductive plate is donut-shaped, and therefore a path length can be minimized, enabling a reduction in inductance. Moreover, by providing a large surface area and disposing an outward path for the + power supply and a return path for the − power supply in opposite orientations, inductance is canceled out, and as a result, unwanted noise radiation can be suppressed.

According to the first embodiment, as described above, the frame has upper and lower surfaces that extend in a perpendicular direction to the motor output shaft, the donut-shaped conductive plates are attached respectively to the upper and lower surfaces, the conductive plates both include connection terminal portions on the inner and outer peripheral sides thereof, the inverter circuit is formed from the power module constituted by the plurality of switching elements, the power supply terminals are provided on one side of the package forming the power module, the output terminal that is connected to the winding terminal for supplying power to the motor and the control terminal that is connected to the control signal are provided on the opposing side, the terminal portions on the inner peripheral sides of the conductive plates are connected to the power supply terminals of the power module, and the control board is connected to the control terminal of the power module.

As a result, the surface area of the control board can be used more effectively, and the shapes of the respective conductive plates can be simplified and increased in uniformity.

More specifically, by altering the shape and arrangement of the power supply system conductive plates, providing the conductive plates in a duplex configuration, and altering the connection position between the inverter circuit and the control board, the surface area of the control board can be used more effectively, and the shapes of the respective conductive plates can be simplified and increased in uniformity. Moreover, a plate width can be increased, enabling a reduction in an internal resistance value of the manufactured product. Furthermore, by forming the conductive plates in a circular shape, noise generation can be reduced.

Note that by reversing the polarity of the power module 35b, the conductive plate 41 can be used as the − power supply conductive plate and the conductive plate 42 can be used as the + power supply conductive plate.

Second Embodiment

Figure 8:
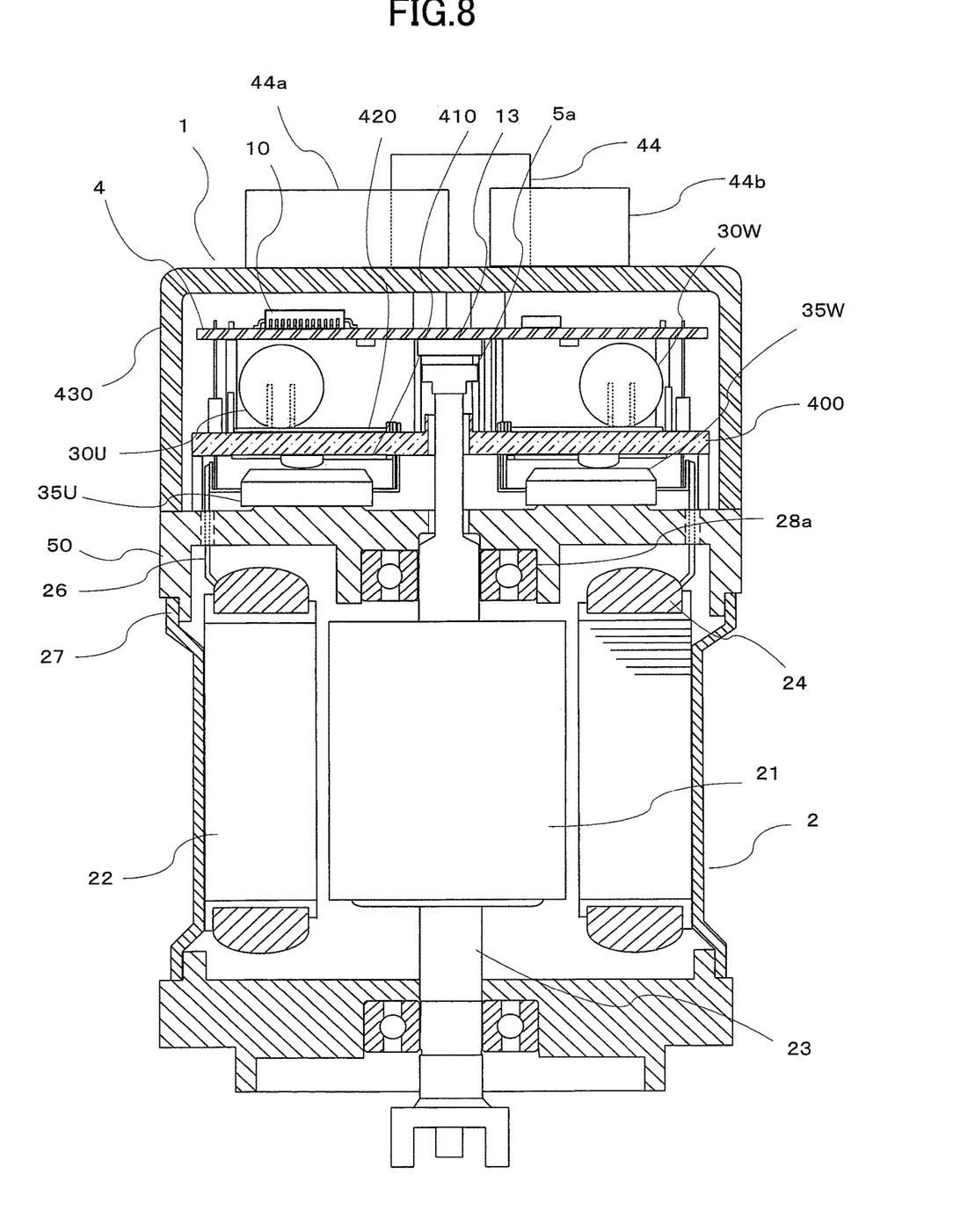
FIG. 8 is a sectional view showing an electric power steering device according to a second embodiment of this invention.

FIG. 8 is a sectional view showing an electric power steering device according to a second embodiment of this invention. Note that identical sites to FIGS. 1 to 7 have been allocated identical reference numerals. Further, FIG. 8 differs from FIG. 2 of the first embodiment in that the control unit 1 is mounted on an anti-output side of the output shaft 23.

In FIG. 8, the winding terminal 26 led out from the three-phase winding 24 is formed from a wire material and can therefore be led out directly from the winding part. Accordingly, the annular ring 25 used in the first embodiment can be omitted. Further, a plate 50 that serves as a lid for the motor 2 and holds a bearing 28a in the center thereof is fitted to the motor case 27.

Furthermore, although not shown in the drawing, the plate 50 includes a joint part that is joined to a housing 430 of the control unit 1. Moreover, a surface of the plate 50 on an upper side of the drawing contacts the power modules 35U, 35W (35V is not shown) closely so as to serve as a heat sink. The plate 50 having the plurality of functions described above is formed from a metal such as aluminum, for example, to secure a heat dissipation ability and ensure that a secure, waterproof case is formed thereby.

Further, in FIG. 8, the control unit 1 is provided on top of the plate 50, and a circuit portion is mounted in the interior thereof, which is covered by the housing 430. Moreover, the connectors 44, 44a, 44b are disposed on an upper surface of the housing 430. Here, the connector 44 is used for the power supply (+, −), while the connectors 44a, 44b are used for sensor signals not related to the power supply system.

Furthermore, terminals or extension portions of the connectors 44a, 44b are led out and connected to the control board 4. Note that power supply system terminals of the connector 44 are used by the inverter circuit 3 in particular, and are therefore led out in a downward direction below the control board 4. Moreover, the housing 430 is manufactured by molding insulating resin to facilitate fitting to or integration with the connectors, and to achieve a reduction in weight and so on.

In the interior of the control unit 1, from the motor 2 side, the heat generating components, namely the power modules 35 and the power supply switching element 14, not shown in the drawing, are mounted in close contact with the plate 50, a frame 400 serving as an intermediate member is stacked thereon, and the control board 4 installed with the CPU 10 and so on is stacked thereon.

Further, holes having large diameters are opened in respective central portions of the plate 50 and the frame 400, and the output shaft 23 is passed through the holes. Moreover, a rotation sensor rotor 5a is mounted on an end portion of the output shaft 23. The rotor 5a corresponds to the rotation sensor 5 shown in FIG. 1, and a plurality of magnets are attached to the rotor 5a.

Meanwhile, the rotation angle detection circuit 13 is installed on the lower surface of the control board 4 opposite the rotor 5a such that rotation angle signals detected thereby are transmitted to the CPU 10 via the control board 4. Moreover, conductive plates 410, 420 are mounted respectively on upper and lower surfaces of the frame 400, and the capacitors 30U, 30W (30V is not shown), which are large components, are mounted horizontally in the space between the frame 400 and the control board 4.

Figure 9:
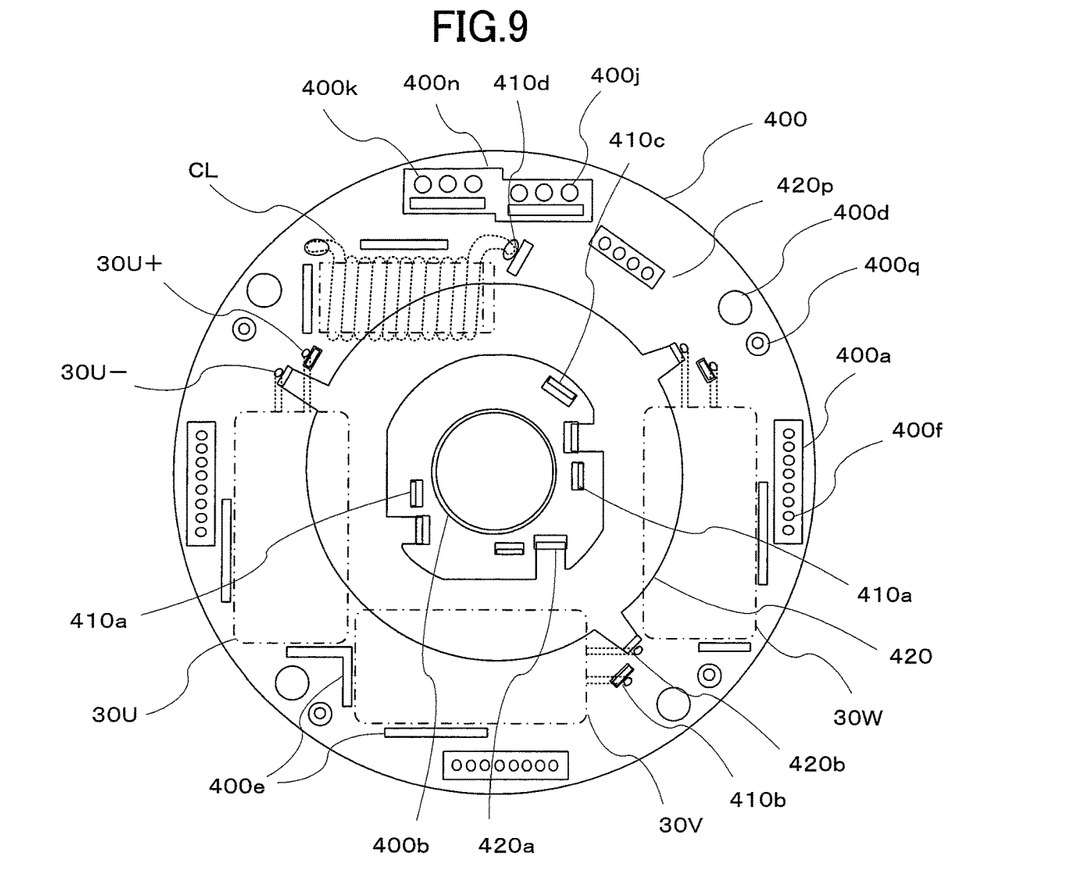
FIG. 9 is a plan view showing one surface of a frame of the electric power steering device according to the second embodiment of this invention.
Figure 10:
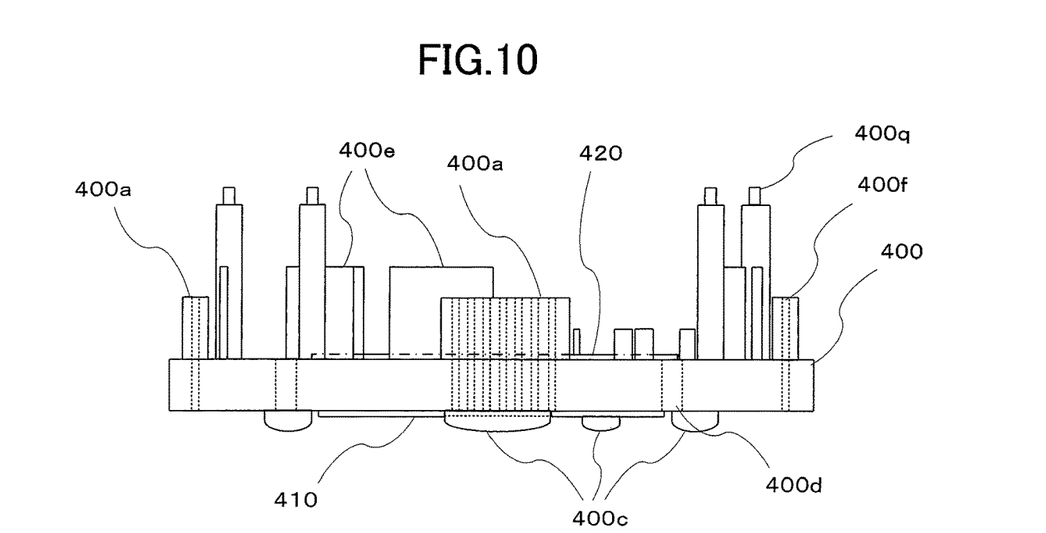
FIG. 10 is a side sectional view showing the frame of the electric power steering device according to the second embodiment of this invention.

Next, referring to FIGS. 9 and 10, the frame 400, the conductive plate 420, and so on will be described. FIG. 9 is a plan view showing one surface of the frame of the electric power steering device according to the second embodiment of this invention. FIG. 10 is a side sectional view showing the frame of the electric power steering device according to the second embodiment of this invention. Note that FIG. 9 shows the frame 400 from the upper side of FIG. 8, and the control board 4 has been omitted therefrom.

In FIGS. 9 and 10, the frame 400 is formed in a circular shape having a substantially identical diameter to the motor case 27, and a large-diameter hole through which the output shaft 23 passes is opened in the center thereof. Further, a tubular portion 400b extends around the periphery of the large-diameter hole. Furthermore, the donut-shaped conductive plate 420 is mounted on the periphery of the tubular portion 400b.

Here, guide portions 400a including holes 400f for the terminals of the power modules 35 are disposed discretely at substantially equal intervals in three locations near the outer periphery of the frame 400. Further, a guide portion 400n including three power supply terminal holes 400j and three power supply terminal holes 400k is disposed on an upper side of the drawing, and a guide portion 420p including holes for the power supply switching element 14 is disposed on the right side thereof.

Furthermore, the coil CL and the capacitors 30U, 30V, 30W are disposed on the frame 400 as indicated by dot-dash lines. Specifically, the capacitors 30 are mounted directly above the power modules 35 such that the frame 400 is sandwiched therebetween. At this time, the capacitors 30 are disposed horizontally, and therefore a height thereof in the direction of the output shaft can be suppressed in comparison with vertically disposed capacitors.

The conductive plate 420 is formed in a donut shape, and includes terminal portions 420a disposed to extend in three locations on an inner peripheral side and terminal portions 420b disposed to extend in three locations on an outer peripheral side. In the conductive plate 420, the terminal portions 420a serve as − power supplies (grounds) for leg portions or terminals of respective components.

Further, the terminal portions 420a disposed in three locations on the inner peripheral side are connected (welded) respectively to the − terminals of the power modules 35, while the terminal portions 420b disposed in three locations on the outer peripheral side are welded to the − leg portions of the capacitors, as indicated by dotted lines. Although not shown in the drawing, the respective connector terminal holes 400j are connected to the conductive plate 420.

Furthermore, in the frame 400, holes 400d provided in four locations are used to fix the frame 400 to the plate 50, while columns 400q are used to mount the control board 4. Similarly, terminal portions 410a are disposed in four locations on the inner peripheral side and four locations on the outer peripheral side of the donut, and the + power supply conductive plate 410 is mounted in a donut shape on the rear surface of the drawing.

The terminal portions 410a extend from the conductive plate 410 so as to pass through the frame 400. Here, the terminal portions 410a disposed in three locations on the inner peripheral side are used for the + terminals of the power modules 35, while 410c on the inner peripheral side is used for the output terminal of the power supply switching element 14. These terminal portions are formed integrally with the conductive plate 410.

Meanwhile, the terminal portions 410b disposed in three locations on the outer peripheral side are used for the + leg portions of the capacitors 30, while 410d on the outer peripheral side is used for the input terminal of the power supply switching element 14. Furthermore, the + power supply terminal holes 400k for the connectors and one end of the coil CL are connected by a small conductive plate, not shown in the drawings.

Further, a plurality of partitions 400e for positioning the capacitors 30 and the coil CL are provided on the frame 400. Moreover, projections 400c for bringing the power modules 35 and the power supply switching element 14 into close contact with the plate 50 are provided on the rear surface of the frame 400.

Hence, even when the control unit 1 is disposed coaxially in the anti-output direction, as described above, the power supply (+, −) conductive plates can be disposed concentrically with the frame 400, which serves as the intermediate member between the control board 4 and the inverter circuit 3, on the front and rear surfaces thereof, while the power module power supply terminal portions and the capacitor terminal portions can be disposed discretely on the inner peripheral side and the outer peripheral side, respectively. Thus, the shapes of the conductive plates can be simplified, while the power supply system and the control signal terminals can be disposed on the inner peripheral side and the outer peripheral side, respectively. As a result, the surface area of the control board can be utilized more effectively, inductance generated when the conductive plates are mounted on the respective surfaces can be reduced, and noise can be suppressed.

The invention claimed is:

1. A control unit for controlling driving of a motor, the control unit being formed integrally with the motor so as to be coaxial with a motor output shaft of the motor, and comprising:
   a control board that is housed in the interior of a housing forming an outer covering of the control unit, and that calculates a control signal for the motor and outputs the calculated control signal;
   an inverter circuit that supplies power to the motor in accordance with the control signal; and
   a frame that serves as an intermediate member provided between the control board and the inverter circuit,
   wherein the frame has upper and lower surfaces that extend in a perpendicular direction to the motor output shaft, donut-shaped conductive plates are mounted respectively on the upper and lower surfaces, and the conductive plates both include connection-forming terminal portions provided on inner and outer peripheral sides thereof,
   the inverter circuit is constituted by a power module formed from a plurality of switching elements, a power supply terminal is provided on one side of a package forming the power module, while an output terminal connected to a winding terminal for supplying power to the motor and a control terminal connected to the control signal are provided on an opposing side, and the terminal portions on the inner peripheral sides of the conductive plates are connected to the power supply terminal of the power module, and the control board is connected to the control terminal of the power module.

2. The control unit according to claim 1, wherein the power supply terminal of the power modules is constituted by + and − terminals, the terminal portions of the conductive plates mounted on the frame project in a parallel direction to the motor output shaft, the terminal portions projecting from respective surfaces of the conductive plates are all oriented in an identical direction, the terminal portions of one of the conductive plates pass through the frame and project up to the terminal portions of the other conductive plate so as to form pairs therewith, and the terminal portions formed on the inner peripheral sides of the conductive plates connect terminals forming the pairs on the respective surfaces of the conductive plates to the power supply terminals of the power module.

3. The control unit according to claim 1, wherein a leg portion of at least one of a capacitor and a coil installed in the control unit and the terminal portions formed on the outer peripheral sides of the conductive plates are connected to each other, and resulting connection portions are disposed on an identical side of the frame to connection portions connecting the terminal portions formed on the inner peripheral sides of the conductive plates to the power supply terminals of the power module.

4. The control unit according to claim 1, wherein a terminal of a connector for supplying power to the control unit is connected to the conductive plates on the frame in a position between the plurality of terminal portions.

5. The control unit according to claim 1, wherein a large-diameter hole through which the motor output shaft passes is formed in a central portion of the frame, and the terminal portions on the inner peripheral sides of the conductive plates are disposed discretely on a periphery of the hole, a group of small holes for the control signal terminal of the power module is disposed near an outer periphery of the frame, and the terminal portions formed on the outer peripheral sides of the conductive plates are positioned on the inner peripheral side of the group of small holes.

6. The control unit according to claim 1, wherein one surface of the frame is provided with:

a partition for positioning at least one of a capacitor and a coil installed in the control unit;

a column for fixing the control board while maintaining a distance to the control board; and a guide portion for extending a hole used for the control signal terminal of the power module.

7. The control unit according to claim 1, wherein the motor, the control board, the frame, and the power module are disposed coaxially in that order on an output side of the motor output shaft.

8. The control unit according to claim 1, wherein the motor, the power module, the frame, and the control board are disposed coaxially in that order on an anti-output side of the motor output shaft.

9. An electric power steering device constituted by the control unit according to claim 1 and the motor, and generating auxiliary steering torque using the motor.

* * * * *